(12) United States Patent
Delorme et al.

(10) Patent No.: US 9,719,006 B2
(45) Date of Patent: Aug. 1, 2017

(54) BIODEGRADABLE ADDITIVE CONCENTRATE IMPROVING THE LUBRICITY OF AQUEOUS SLUDGES, USE THEREOF AND AQUEOUS SLUDGE FOR DRILLING

(71) Applicant: TOTAL MARKETING SERVICES, Puteaux (FR)

(72) Inventors: Géraldine Delorme, Brignais (FR); Thomas Dubois, Lyons (FR)

(73) Assignee: TOTAL MARKETING SERVICES, Puteaux (FR)

( * ) Notice: Subject to any disclaimer, the term of this patent is extended or adjusted under 35 U.S.C. 154(b) by 118 days.

(21) Appl. No.: 14/758,163

(22) PCT Filed: Dec. 23, 2013

(86) PCT No.: PCT/EP2013/077893
§ 371 (c)(1),
(2) Date: Jun. 26, 2015

(87) PCT Pub. No.: WO2014/102237
PCT Pub. Date: Jul. 3, 2014

(65) Prior Publication Data
US 2015/0353806 A1    Dec. 10, 2015

(30) Foreign Application Priority Data

Dec. 28, 2012  (FR) ...................... 12 62900

(51) Int. Cl.
| C09K 8/06 | (2006.01) |
| C09K 8/08 | (2006.01) |
| C09K 8/12 | (2006.01) |
| C09K 8/20 | (2006.01) |

(52) U.S. Cl.
CPC .................. *C09K 8/06* (2013.01); *C09K 8/08* (2013.01); *C09K 8/12* (2013.01); *C09K 8/20* (2013.01); *C09K 2208/34* (2013.01)

(58) Field of Classification Search
None
See application file for complete search history.

(56) References Cited

U.S. PATENT DOCUMENTS

| 3,761,410 A * | 9/1973 | Mondshine ............... C09K 8/22 507/134 |
| 4,212,794 A | 7/1980 | Grodde et al. | |
| 5,627,143 A * | 5/1997 | Sawdon .................. C09K 8/34 507/103 |
| 2003/0236175 A1* | 12/2003 | Twu ....................... C07C 5/2512 507/200 |
| 2012/0283151 A1 | 11/2012 | Espagne et al. | |

FOREIGN PATENT DOCUMENTS

| EP | 0652271 | 5/1995 |
| FR | 2185672 | 1/1974 |
| FR | 2953853 | 6/2011 |
| WO | WO 2014/102237 | 7/2014 |

OTHER PUBLICATIONS

International Search Report (and its English translation) dated Feb. 3, 2014 for PCT Application No. PCT/EP2013/077893 (WO 2014/102237) which is the parent application to the instant application; 5 pages.

* cited by examiner

*Primary Examiner* — John J Figueroa
(74) *Attorney, Agent, or Firm* — Harness, Dickey & Pierce, P.L.C.

(57) ABSTRACT

Biodegradable additive concentrate with pour point according to standard ASTM D 97 below −5° C., improving the lubricity of water-based muds, comprising at least one compound selected from the group consisting of:
  the diglycerol mono- and diesters,
  the acids and the ester derivatives of monocarboxylic fatty acids comprising from 16 to 22 carbon atoms per chain,
  the acids and the ester derivatives of resin acids,
  the monoesters of polyol comprising more than 4 hydroxylated groups and of carboxylic fatty acids comprising from 6 to 12 carbon atoms, saturated and unsaturated by at least one unsaturation, and
  the mono- and polyalkoxylated esters of saturated and unsaturated dicarboxylic acids comprising from 6 to 12 carbon atoms.

The use of this concentrate in a water-based mud and the water-based mud containing said concentrate that can be used for drilling.

13 Claims, No Drawings

BIODEGRADABLE ADDITIVE CONCENTRATE IMPROVING THE LUBRICITY OF AQUEOUS SLUDGES, USE THEREOF AND AQUEOUS SLUDGE FOR DRILLING

CROSS REFERENCE TO RELATED APPLICATIONS

This patent application is a U.S. national stage filing under 35 U.S.C. §371 of International Application No. PCT/EP2013/077893 filed Dec. 23, 2013 (published as WO 2014/102237 on Jul. 3, 2014, which claims priority to and benefit of France application No. 1262900 filed Dec. 28, 2012. The disclosures of the applications identified in this paragraph are incorporated herein by reference in their entirety.

The present invention relates to a biodegradable concentrate improving the lubricity of water-based muds whether during drilling or during formation fracturing.

The invention also relates to the use of this biodegradable concentrate in a water-based mud as additive among other functional additives suitable for the application envisaged for said mud whether in drilling or in fracturing. Finally the additive-treated water-based mud obtained after adding all its components is particularly suitable for shallow onshore drilling operations.

Certain sites, such as large civil engineering projects, use large quantities of fluids containing additives improving their lubricant properties and/or resistance to friction which aid the proper operation of the tools used with these fluids, in particular for machining, piercing and/or drilling, where there are major problems with friction. However, these fluids used in large quantities are released in the form of rocky spoil after use, which means that they must not pose any danger to the environment. Often this rocky spoil must be retreated after use. Therefore a major objective is to provide fluids that are completely biodegradable and can be released into the environment. This applies in particular to drilling fluids and muds, both offshore and onshore.

It is known that drilling is of prime importance in petroleum exploitation and that drilling is becoming deeper and deeper. Drilling technology is constantly evolving, whether onshore or offshore, especially deep offshore, but also, more recently, in horizontal or deflected drilling, where, by successive inclinations of one or two degrees, the trajectory of the well becomes curved, which makes it possible to reach horizontal deposits at least more than a kilometer or even more than ten kilometers from the wellhead.

The frictional forces that are exerted are therefore becoming greater and greater, hence the increased importance of the lubricant properties of the drilling fluid and of its effect on resistance to friction at the level of the drilling tools.

As is well known, the drilling technique uses a drill bit fixed on the end of drillpipes, which, when driven in rotation, bores the well by grinding the rocks.

As drilling progresses, drill bits of smaller and smaller diameter are used, and at each step the well is consolidated with a steel tube called "casing", which is lowered inside the hole, and then fixed with cement.

During drilling, a drilling fluid is circulated, with injection into the drill bit and expulsion from the latter into the contact zone with the rock, and is then brought back up to the top of the well through the annular space separating the drillpipes from the "casing".

This fluid generally performs the following main functions:

cooling the drill bit,
reducing the metal/metal frictional forces, between the casing and the drillpipes, and metal/rock frictional forces, both at the level of the drill bit and in the annular zone, since the fluid comes up laden with particles of ground rock, called "cuttings" in the art,
discharging the rock debris to the exterior,
creating a pressure on the walls of the hole, to prevent their collapse, and
balancing the pressures between the bottom of the well and the surface, in order to maintain control of the well and prevent a blowout.

In the case of deep-water offshore drilling, the water temperatures encountered, close to 4 to 5° C., require good control of the viscosity of the drilling fluids at these low temperatures.

Various types of drilling fluids or muds have been used in the past, such as water-based fluids, containing water and additives for adjusting their density and their rheological properties, oil-based fluids, and emulsions of the water-in-oil type or inverted emulsions, of the oil-in-water type, as described in particular in U.S. Pat. No. 2,816,073.

In water-based muds (WBMs), the drilling fluid is water; the water-based muds are generally reserved for applications that are not very technical and for very shallow onshore or offshore drilling (a few meters).

As in the case of fluids containing a high proportion of water, various problems arise such as excessive acidity or basicity of these muds, which can give rise to blocking of the tools, adjustment of the density and viscosity but also problems of friction at the level of the drilling tool and tool-rock contacts. This last-mentioned point raises the problem of the lubricating capacity of a water-based mud and improvement of its lubricity with additives called lubricity additives and/or anti-wear additives and/or also anti-friction additives.

Improvement of the lubricity of muds has been the subject of many works and various ways of measuring the lubricity of these water-based muds have been envisaged.

In patent US2010/0305009, the inventors suggest the use of oligoglycerol esters in water-based muds containing more than 70% by weight of water. More particularly, these oligoglycerol esters contain from 20 to 45% by weight of glycerol, from 20 to 40% by weight of diglycerol, from 10 to 20% by weight of triglycerol, from 1 to 10% by weight of tetraglycerol and 0.5 to 5% by weight of pentaglycerol in the form of esters of fatty acids comprising from 2 to 18 carbon atoms, mono- and polyunsaturated, preferably of oleic, linoleic and/or linolenic acid or of pine oil (tall oil) fatty acids.

In U.S. Pat. No. 3,047,493, in order to improve its lubricity, it is proposed to add to water-based mud, from 0.3 to 7% by weight of an organic carboxylic compound, of the tall oil type containing saturated, mono- and polyunsaturated fatty acids and resin acids, or also triglycerides of fatty acids with 12 to 18 carbon atoms per chain. In order to improve the miscibility of these products, it is proposed to add emulsifiers such as non-ionic surfactants, clay (between 0.25 and 20% by weight in the mud), lignin or also sulphonate derivatives such as calcium lignosulphonate or a calcium alkaryl sulphonate.

In U.S. Pat. No. 4,409,108, a composition is proposed for reducing the resistance to friction in an aqueous fluid between the moving part and the adjacent surface of a tool, said composition comprising up to 5% by weight of the composition of an odour masking agent, from 5 to 60% by weight of a 50/50 mixture of glycerol monooleate and glycerol dioleate and from 10 to 90% by weight of an alcohol or mixture of alcohols with 7 to 10 carbon atoms, these alcohols being essentially linear.

In U.S. Pat. No. 6,806,235, a method is proposed that produces an improvement in the lubricity of a water-based drilling fluid by adding, to said aqueous drilling fluid, a lubricating compound comprising a partial glyceride derived from tall oil fatty acids. This partial glyceride has a pour point preferably below 0° C. The aqueous drilling fluid comprises more than 90% by weight of water, and from 1 to 3% by weight of partial glyceride. As this partial glyceride is water-insoluble, an anionic surfactant from the group of sulphonates and sulphates of linear fatty acids, optionally mixed in a ratio of surfactant to partial glyceride varying from 1:10 to 1:20, is added.

For determining the lubricity of the various additives envisaged for a water-based drilling mud in these patents, only the Falex method measuring shear strength in water-based muds containing all the components necessary for a given application is envisaged in certain of these patents. In the context of the present invention, screening for compounds having the ability to improve the lubricity of the water-based mud and therefore of water is carried out independently of the constituents added to the mud subsequently. This screening was carried out using the method of measurement known as the high-frequency reciprocating rig (HFRR) method. This test makes it possible to evaluate the lubricity of the compositions by reproducing the operating conditions of standard ISO 12156-1 for a test duration fixed at 115 minutes, an aqueous matrix and a temperature corresponding to ambient temperature (25° C.).

One of the applicant's main objectives is to obtain an effectiveness of lubricity greater than or equal to that of the commercially available additives while maintaining a completely biodegradable character of these additives with respect to the environment into which they might be released after use. Moreover, these additives must be water-miscible without the addition of sulphate and sulphonate derivatives.

Another objective is to use additives that have a pour point measured according to standard ASTM D97 that is well below that of water, i.e. below 0° C. and even below −5° C.

A subject of the present invention is therefore a biodegradable additive concentrate for water-based mud with a pour point according to standard ASTM D97 below −5° C. improving the lubricity of water-based muds, said concentrate being characterized in that it comprises at least one compound selected from the group consisting of the diglycerol mono- and diesters, the acids and the ester derivatives of monocarboxylic fatty acids comprising from 16 to 22 carbon atoms per chain, the acids and the ester derivatives of resin acids, the monoesters of polyol comprising more than 4 hydroxylated groups and of carboxylic fatty acids comprising from 6 to 12 carbon atoms, saturated and unsaturated by at least one unsaturation, and the mono- and polyalkoxylated esters of saturated and unsaturated dicarboxylic acids comprising from 6 to 12 carbon atoms.

According to one embodiment, the biodegradable additive concentrate consists only of at least one compound selected from the group consisting of the diglycerol mono- and diesters, the acids and the ester derivatives of monocarboxylic fatty acids comprising from 16 to 22 carbon atoms per chain, the acids and the ester derivatives of resin acids, the monoesters of polyol comprising more than 4 hydroxylated groups and of carboxylic fatty acids comprising from 6 to 12 carbon atoms, saturated and unsaturated by at least one unsaturation, and the mono- and polyalkoxylated esters of saturated and unsaturated dicarboxylic acids comprising from 6 to 12 carbon atoms.

Advantageously, the active materials having an influence on the lubricity of water-based mud can be used alone or mixed with another active material with which, besides dissolution of the least dispersible substance, a synergistic effect is also observed with respect to the lubricity of the mud. Thus, the biodegradable additive concentrate can comprise at least one compound selected from the group consisting of:
  the diglycerol mono- and diesters,
  the acids and the ester derivatives of monocarboxylic fatty acids comprising from 16 to 22 carbon atoms per chain, and
  the acids and the ester derivatives of resin acids, optionally mixed with at least one compound selected from the group consisting of the monoesters of polyol comprising more than 4 hydroxylated groups and carboxylic fatty acids comprising from 6 to 12 carbon atoms, saturated and unsaturated with at least one unsaturation, and the mono- and polyalkoxylated esters of saturated and unsaturated dicarboxylic acids comprising from 6 to 12 carbon atoms, or a mixture thereof.

According to one embodiment, the biodegradable additive concentrate consists of at least one compound selected from the group consisting of:
  the diglycerol mono- and diesters,
  the acids and the ester derivatives of monocarboxylic fatty acids comprising from 16 to 22 carbon atoms per chain, and
  the acids and the ester derivatives of resin acids,
mixed with at least one compound selected from the group consisting of the monoesters of polyol comprising more than 4 hydroxylated groups and carboxylic fatty acids comprising from 6 to 12 carbon atoms, saturated and unsaturated with at least one unsaturation, and the mono- and polyalkoxylated esters of saturated and unsaturated dicarboxylic acids comprising from 6 to 12 carbon atoms, or a mixture thereof.

The monoesters of polyol comprising more than 4 hydroxylated groups and of carboxylic fatty acids comprising from 6 to 12 carbon atoms, saturated and unsaturated by at least one unsaturation, and the mono- and polyalkoxylated esters of saturated and unsaturated dicarboxylic acids comprising from 6 to 12 carbon atoms have solvation properties.

Thus, mixtures of fatty acids and/or resin acids with mixtures of diglycerol mono- and diesters or also with monoesters of polyols such as sorbitol or sorbitan allow both dissolution in water and improvement of the lubricity of water for quantities of active substances in the water less than those found in the prior art, in particular once the concentration of said concentrate reaches 200 ppm by weight.

Thus, the additive concentrate will advantageously comprise mixtures of diglycerol monoesters and diesters obtained from at least one saturated or polyunsaturated monocarboxylic fatty acid ester comprising from 16 to 22 carbon atoms. Preferably, the mixture will comprise a diglycerol monoester content varying from 30 to 60% by weight of the mixture and a diglycerol diester content varying from 40 to 70% by weight of the mixture, the ester group being obtained from at least one saturated or unsaturated linear fatty acid ester comprising from 16 to 22 carbon atoms.

Preferably, the diglycerol monoester/diester mixture is obtained by transesterification of fatty acid methyl ester by diglycerol. Thus, said diglycerol monoester/diester mixture can comprise up to 20% by weight of diglycerol triester and less than 8% of diglycerol tetraester.

In another embodiment of the invention, the concentrate can comprise up to 50% by weight of active substance consisting of at least one acid or linear monocarboxylic fatty acid ester derivative comprising from 16 to 22 carbon atoms optionally mixed with at least one resin acid selected from the group of abietic acid and derivatives thereof.

As these compounds are not water-soluble, they are dissolved in water by adding solvents or another active substance capable of dissolving them.

Thus, the concentrate according to the invention can comprise from 50 to 99% by weight of at least one compound with solvation properties selected from the polyol monoesters comprising from 5 to 10 hydroxylated groups and the carboxylic fatty acids comprising from 6 to 12 carbon atoms, saturated and unsaturated by at least one unsaturation or also from the polyethoxylated esters of linear dicarboxylic acids. An example is the product NYCOBASE 618 mainly constituted by ethoxylated esters of dicarboxylic acids.

In a first embodiment, the concentrate will comprise from 50 to 100% by weight of the diglycerol mono- and diester mixture and from 0 to 50% of at least one acid or ester derivative of linear monocarboxylic fatty acids comprising from 16 to 22 carbon atoms, optionally mixed with at least one resin acid selected from the group of abietic acid and ester derivatives thereof.

In a second embodiment, the concentrate can comprise 1 to 50% by weight of at least one acid or ester derivative of linear monocarboxylic fatty acids comprising from 16 to 22 carbon atoms optionally mixed with at least one resin acid selected from the group of abietic acid and ester derivatives thereof and from 50 to 99% by weight of at least one compound with solvation properties selected from the monoesters of polyol comprising from 5 to 10 hydroxylated groups and of carboxylic fatty acids comprising from 6 to 12 carbon atoms, saturated and unsaturated by at least one unsaturation, or else from the polyethoxylated esters of linear dicarboxylic acids.

Among the polyol monoesters, sorbitan laurate is preferred, said ester optionally being ethoxylated.

Preferably, the concentrate comprises a mixture of acids or of esters obtained from a composition mainly constituted by a mixture of linear C16 to C22 monocarboxylic fatty acids.

In particular, said preferred composition based on fatty acids is of natural origin, i.e. within the meaning of the present invention of vegetable and/or animal origin and not of fossil origin.

The compositions predominantly composed of C16-C22 monocarboxylic fatty acids can be obtained for example by hydrolysis of natural and/or genetically modified vegetable oils, or of animal fats; the fatty acids derived from peanut, palm, olive, rapeseed, cotton, maize, sunflower, soya, flax, or tallow oils and/or derived from lard may be mentioned.

Within the meaning of the present invention, by composition predominantly constituted by C16 to C22 monocarboxylic fatty acid(s) is meant any composition in which the concentration of C16 to C22 monocarboxylic fatty acid(s) represents from 60% to 100% based on the total mass of the composition. In general, the rest of the composition comprises monocarboxylic fatty acids the hydrocarbon chain of which has fewer than 16 carbon atoms and/or has more than 22 carbon atoms. The compositions predominantly consisting of C16 to C22 monocarboxylic fatty acid(s) optionally comprise resin acids. The concentration of resin acids preferably represents up to 40% by mass of the acids (fatty acids+resin acids) and advantageously less than 5% of the total mass of the acids (fatty acids+resin acids).

Among the resin acids, the abietic, dihydroabietic, tetrahydroabietic, dehydroabietic, neoabietic, pimaric, laevopimaric, parastrinic acids may be mentioned, non-limitatively.

The compositions predominantly composed of C16 to C22 monocarboxylic fatty acid(s) and containing resin acids can be obtained by distillation of tall oil, a by-product from the manufacture of the wood pulp; the term tall oil fatty acids (TOFAs) is then used. TOFAs are marketed for example by the company TOTAL ADDITIFS & CARBURANTS SPECIAUX under the trade-names PC 30, PC 31 and PC 32. In these commercial mixtures, the resin acids generally represent less than 10% by mass and advantageously less than 5% of the total weight of the acids (fatty acids+resin acids).

The esters of these acids within the meaning of the present invention are preferably esters of glycerol and of TOFA.

A second subject of the invention is the use of the additive concentrate in a water-based mud up to a content of 10,000 ppm by weight relative to the water in order to improve the lubricity of the mud at the level of the tool during drilling.

This use consists of adding preferably 200 to 5000 ppm by weight of additive concentrate according to the invention to the water of the mud.

A third subject of the invention is the water-based mud comprising from 200 to 5000 ppm of an additive concentrate as described above in the presence of compounds capable of adjusting the pH and density of the mud envisaged, in particular in combination with functional additives depending on the type of application of the mud.

In the remainder of the present description, examples are given for purposes of illustration of the present invention and are not in any way intended to limit its scope.

EXAMPLE 1

The present example aims to describe the various additive concentrates according to the invention and the water-based muds that it is possible to prepare from them.

The additive concentrates will be referenced Ci and the muds according to the invention Bi: they are presented in the following Tables I and II, respectively.

TABLE I

| | Diglycerol esters (% by weight) | PC32 (% by weight) | Ester of glycerol and of PC32 (% by weight) | Sorbitan laurate (% by weight) | Nycobase 618 (% by weight) |
|---|---|---|---|---|---|
| C1 | 100 | | | | |
| C2 | | | | | 100 |
| C3 | 50 | | | 50 | |
| C4 | | | | 100 | |
| C5 | | 50 | | | 50 |
| C6 | | 1 | | | 99 |
| C7 | | 10 | | | 90 |
| C8 | | | 1 | | 99 |
| C9 | | | 10 | | 90 |
| C10 | | | 50 | | 50 |
| C11 | | | 1 | 99 | |
| C12 | 10 | | | | 90 |

The water-based muds prepared from the additive concentrates in Table I are shown in Table II. For each of the muds, the wear diameter was measured by an HFRR method derived from ISO 12156-1. This wear diameter is supplemented with a measurement of coefficient of friction.

TABLE II

| Mud | Additive concentrate | Content of concentrate (ppm by mass) | Wear diameter (microns) | Coefficient of friction |
|---|---|---|---|---|
| B0 | — | — | 458 | 0.419 |
| B1 | C1 | 200 | 239 | 0.186 |
| B2 | C1 | 500 | 207 | 0.177 |
| B3 | C1 | 10000 | 178 | 0.123 |
| B4 | C2 | 200 | 344 | 0.210 |
| B5 | C2 | 500 | 260 | 0.190 |
| B6 | C2 | 10000 | 210 | 0.185 |
| B7 | C3 | 200 | 180 | 0.064 |
| B8 | C3 | 10000 | 130 | 0.051 |
| B8 | C4 | 200 | 194 | 0.164 |
| B9 | C4 | 500 | 174 | 0.132 |
| B10 | C4 | 10000 | 131 | 0.102 |
| B11 | C5 | 200 | 260 | 0.218 |
| B12 | C5 | 10000 | 174 | 0.073 |
| B13 | C6 | 200 | 352 | 0.284 |
| B14 | C6 | 10000 | 188 | 0.182 |
| B15 | C7 | 200 | 387 | 0.286 |
| B16 | C7 | 500 | 230 | 0.237 |
| B17 | C7 | 10000 | 177 | 0.148 |
| B18 | C8 | 200 | 453 | 0.258 |
| B19 | C8 | 500 | 245 | 0.264 |
| B20 | C8 | 10000 | 190 | 0.185 |
| B21 | C9 | 200 | 379 | 0.287 |
| B22 | C9 | 500 | 250 | 0.255 |
| B23 | C9 | 10000 | 213 | 0.179 |
| B24 | C10 | 200 | 237 | 0.215 |
| B25 | C10 | 500 | 224 | 0.197 |
| B26 | C10 | 10000 | 163 | 0.139 |
| B27 | C11 | 200 | 180 | 0.064 |
| B28 | C12 | 200 | 352 | 0.261 |
| B29 | C12 | 500 | 234 | 0.245 |
| B30 | C12 | 10000 | 175 | 0.182 |

It can be seen from Table II that the use of the additive concentrate makes it possible to reduce the coefficient of friction. In fact, the coefficient of friction obtained for the additives according to the invention is always less than 0.419, which is the reference value for mud B0. When the additive concentrate in the water reaches 500 ppm by weight, the lubricity of the fluid is improved significantly, which is reflected in a reduction in the wear diameter and coefficient of friction.

EXAMPLE 2

This example aims to compare the performance of the water-based muds according to the invention in terms of improvement of the lubricity of these muds by HFRR measurement and determination of the coefficient of friction relative to the performance of a commercially available "Radiagreen EME salt" additive. The results are presented in Table III

TABLE III

| Mud | Additive concentrate | Concentrate content (ppm by weight) | Salinity | Wear diameter (microns) | Coefficient of friction |
|---|---|---|---|---|---|
| B'0 | — | — | — | | |
| B'1 | C1 | 10000 | — | 178 | 0.123 |
| B'2 | C4 | 10000 | — | 131 | 0.102 |
| B'3 | Radiagreen EME Salt | 10000 | — | 157 | 0.139 |
| B'4 | — | — | TH30[1] | 610 | 0.387 |
| B'5 | C1 | 200 | TH30 | 627 | — |
| B'6 | C1 | 10000 | TH30 | 223 | 0.129 |
| B'7 | C4 | 200 | TH30 | 442 | — |
| B'8 | C4 | 500 | TH30 | 200 | — |
| B'9 | C4 | 10000 | TH30 | 158 | 0.102 |
| B'10 | C5 | 200 | TH30 | 492 | — |
| B'11 | C5 | 500 | TH30 | 195 | — |
| B'12 | C5 | 10000 | TH30 | 151 | 0.119 |
| B'13 | C10 | 200 | TH30 | 477 | — |
| B'14 | C10 | 500 | TH30 | 181 | — |
| B'15 | C10 | 10000 | TH30 | 140 | 0.125 |
| B'16 | Radiagreen EME Salt | 200 | TH30 | 204 | — |
| B'17 | Radiagreen EME Salt | 500 | TH30 | 190 | — |
| B'18 | Radiagreen EME Salt | 10000 | TH30 | 160 | 0.120 |

Corresponds to a $CaCl_2$ content of 0.333 g/L

The wear results obtained with the additive concentrates according to the invention demonstrate performance similar to the commercial additives starting from 500 ppm by weight.

The invention claimed is:

1. Biodegradable additive concentrate with a pour point according to standard ASTM D97 below −5° C., which improves the lubricity of water-based muds, characterized in that it comprises at least one compound selected from the group consisting of:
   the diglycerol mono- and diesters,
   the acids and the ester derivatives of monocarboxylic fatty acids comprising 16 to 22 carbon atoms per chain, and
   the acids and the ester derivatives of resin acids,
mixed with at least one compound with solvation properties selected from the group consisting of:
   the monoesters of polyol comprising more than 4 hydroxylated groups and of carboxylic fatty acids comprising from 6 to 12 carbon atoms, saturated and unsaturated by at least one unsaturation,
   the mono- and polyalkoxylated esters of saturated and unsaturated dicarboxylic acids comprising from 6 to 12 carbon atoms, and
   a mixture thereof.

2. Concentrate according to claim 1, in which the diglycerol monoesters and diesters are added together to said concentrate, the diglycerol monoester content varying from 30 to 60% by weight of the mixture and the diglycerol diester content varying from 40 to 70% by weight of the mixture, the ester group being obtained from at least one saturated and/or unsaturated linear fatty acid comprising from 16 to 22 carbon atoms.

3. Biodegradable concentrate according to claim 1 comprising up to 50% by weight of at least one acid or ester derivative of linear monocarboxylic fatty acids comprising from 16 to 22 carbon atoms optionally mixed with at least one resin acid selected from the group of abietic acid and derivatives thereof.

4. Concentrate according to claim 1 comprising from 50 to 99% by weight of at least one compound with solvation properties selected from the monoesters of polyol comprising from 5 to 10 hydroxylated groups and of carboxylic fatty acids comprising from 6 to 12 carbon atoms, saturated and unsaturated by at least one unsaturation, or also from the polyethoxylated esters of linear dicarboxylated acids.

5. Concentrate according to claim 1, characterized in that it comprises from 50 to 100% by weight of the diglycerol mono- and diester mixture and from 0 to 50% of at least one acid or linear monocarboxylic fatty acid ester derivative comprising from 16 to 22 carbon atoms, optionally mixed with at least one resin acid selected from the group of abietic acid and ester derivatives thereof.

6. Concentrate according to claim 1, characterized in that it comprises from 1 to 50% by weight of at least one acid or linear monocarboxylic fatty acid ester derivative comprising from 16 to 22 carbon atoms optionally mixed with at least one resin acid and/or an ester derivative of said acid selected from the group of abietic acid and derivatives thereof, and from 50 to 99% by weight of at least one compound with solvation properties selected from the monoesters of polyol comprising from 5 to 10 hydroxylated groups and of carboxylic fatty acids comprising from 6 to 12 carbon atoms, saturated and unsaturated by at least one unsaturation, or also from the polyethoxylated esters of linear dicarboxylated acids.

7. Concentrate according to claim 6, characterized in that the compound with solvation properties is sorbitan laurate.

8. Concentrate according to claim 1, characterized in that it comprises a mixture of acids or of esters obtained from a composition mainly constituted by a mixture of linear C16 to C22 monocarboxylic fatty acids, optionally mixed with at least one resin acid.

9. Concentrate according to claim 8, characterized in that the composition mainly constituted by a mixture of fatty acids is of natural origin, i.e. of vegetable and/or animal origin.

10. Concentrate according to claim 8, characterized in that the composition mainly constituted by a mixture of fatty acids comprises up to 40% by weight of the composition of resin acids and preferably less than 5% by weight of resin acids.

11. Use of the additive concentrate according to claim 1 in a water-based mud comprising up to a content of 10,000 ppm by weight of said additive concentrate in the water in order to improve the lubricity of said water-based mud.

12. Use according to claim 11, characterized in that the additive concentrate content varies from 200 to 5000 ppm by weight relative to the water of said mud.

13. Water-based mud comprising 200 to 5000 ppm by weight of additive concentrate according to claim 1 in the presence of compounds capable of adjusting the pH and density of the mud envisaged, in particular in combination with functional additives suitable for the type of application of the mud.

* * * * *